Sept. 30, 1947.   R. E. HEROLD   2,428,077
LOCKING TUBE FITTING
Filed June 27, 1946

INVENTOR.
ROBERT E. HEROLD
BY *Richey + Watts*
ATTORNEYS

Patented Sept. 30, 1947

2,428,077

UNITED STATES PATENT OFFICE 2,428,077

LOCKING TUBE FITTING

Robert E. Herold, Cleveland, Ohio, assignor to The Weatherhead Company, Cleveland, Ohio, a corporation of Ohio Application June 27, 1946, Serial No. 679,749

6 Claims. (Cl. 285—175)

My invention relates to locking tube fittings and has for its principal object the provision of improved, easily detachable, and quick locking arrangements for coupling tubes.

A further object of my invention is to provide a tube coupling in which the tubing may be quickly connected or disconnected.

Still another object is to provide a coupling in which the tubing is sealed automatically in the fitting without requiring compressive action of the members of the fitting other than the compression of the seal incident to insertion of the tubing in the fitting.

Other and further objects, features and advantages of the invention will become apparent as the description proceeds.

In carrying out the invention in accordance with the preferred form thereof, I provide a connector having a bore adapted to receive a tube to be coupled and a locking sleeve adapted to be received in the connector surrounding the tube. The tube is provided with a bead spaced a short distance from the end thereof for enabling it to be secured within the fitting, and an O-ring seal is provided in the bore of the connector for preventing leakage of fluid under pressure.

A better understanding of the invention will be afforded by the following detailed description considered in conjunction with the accompanying drawing, in which Fig. 1 is a longitudinal, medial, sectional view of a tube coupling forming an embodiment of my invention;

Like reference characters are utilized throughout the drawing to designate like parts.

Figure 1:
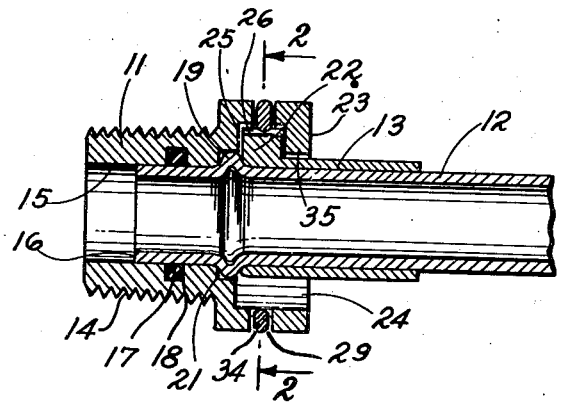
Figure 2:
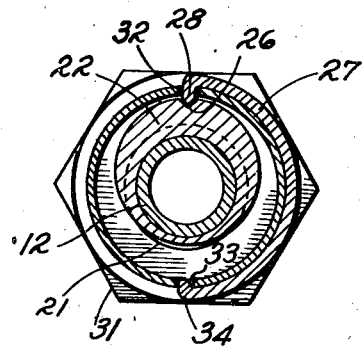
Fig. 2 is a cross-sectional view of the apparatus of Fig. 1, represented as taken along a plane 2—2.

Referring to Figs. 1 and 2 of the drawing, an illustrative arrangement there shown comprises a connector 11 receiving a length of tubing 12 and a rotatable sleeve 13 surrounding the tubing 12 and adapted to lock it within the connector 11. Although my invention is not limited thereto, the connector 11 is shown by way of illustration as having an external pipe thread 14 for enabling it to be joined to a bulkhead, or the like, having a threaded opening with which the connection is to be made by the tubing 12. The connector 11 has a main bore 15 of such diameter as to provide a slip-fit for the outer surface of the end portion 16 of the tubing 12. In order to provide an automatic seal as the tube end 16 is pushed into the connector bore 15, an O-ring type of seal is preferably provided, comprising a resilient ring 17 fitting within an annular groove 18 in the bore 15. Such O-ring seals do not constitute a part of my present invention, but it will be understood that the dimensions are preferably such that a radial depth of the groove 18 is less than the undeformed cross-sectional diameter of the resilient ring 17, which, however, has a smaller cross-sectional area than the groove 18.

The tubing 12 is flared to form a protuberance comprising a bead or flange 19 near the end 16 thereof, but spaced sufficiently therefrom to permit the end portion 16 of the tubing 12 to enter the bore 15 and engage the O-ring seal 17. Preferably the connector 11 is provided with a counter-bore 21 for receiving the bead or flare 19 of the tube 12.

The sleeve 13, which surrounds the tube 12, is coaxial with the tube 12 and the connector bore 15 receiving the tube 12. The locking sleeve 13 is provided with a lug member or with a collar 22 having a variable radius with respect to the connector axis. In the arrangement illustrated in Figs. 1 and 2 the sleeve collar 22 is circular but eccentric with respect to the axis of the members 12, 13 and 15.

The connector 11 has a face 23 with an opening 24 therein, conforming in shape with the outline of the sleeve collar 22 and sufficiently larger to permit the collar 22 to be readily inserted. In the arrangement of Figs. 1 and 2 the connector face opening 24 constitutes an eccentric bore. The connector 11 is provided also with an undercut bore 25 within which the sleeve collar 22 may fit. The undercut bore 25 in the arrangement illustrated is, in effect, a counter-bore, circular and coaxial with the counter-bore 21, but of greater diameter, whereby the collar 22 is freely rotatable to any angular position within the counter-bore 25.

Preferably, means are provided for yieldably retaining the collar 22 in the angular position in which it is locked within the connector 11 and thus locks the tubing 12 therein. To this end, preferably, a notch 26 is formed in the peripheral surface of the collar 22, and a spring 27 is provided having a nose 28 adapted to be resiliently pressed against the peripheral surface of the collar 22 so as to drop into the notch 26. In order to permit the collar 22 to remain rotatable without excessive torque being required to overcome the force of the spring 27, the notch 26 is preferably relatively shallow, and the spring nose 28 is preferably relatively blunt. For the sake of compactness, the spring 27 may take the form of a locking wire composed of a suitable material such as spring steel of nearly circular or semi-circular form fitting within an annular groove 29 formed around the head portion 31 of the connector 11. It is to be understood that the head portion 31 of the connector 11 may be formed hexagonal or polygonal in shape to facilitate threading the connector 11 into the pipe socket with which the threads 14 are intended to mate. A suitable radial opening 32 is provided in the connector head 31 intersecting the undercut bore or counter-bore 25 so as to permit the spring end 28 to enter the counter-bore 25 and contact the collar 22. If desired, a similar opening 33 may also be provided 180° from the opening 32 for receiving the opposite end 34 of the wire 27 to hold the latter in position. The end 34 may be bent inward but is cut off short enough so as not to enter the counter-bore 25.

When it is desired to couple the tubing 12 with the connector 11, the sleeve 13 is first placed over the right-hand portion of the tubing so as to come to the right of the bead 19, and the tubing is then inserted in the bore 15. The collar 22 is inserted in the opening 24 and then turned to the position in which the collar is locked by the overhanging portion 35 of the face 23, in which position the spring nose 28 drops into the notch 26 and locks the sleeve 13 against further rotation.

Referring to Fig. 2, it will be observed that the notch 26 is in the maximum radius portion of the collar 22, and likewise the opening 32 for the spring nose 28 is in the portion of the counter-bore or undercut bore 25 at which the radial overhang 35 of the face 23, with respect to the outer periphery of the bore 25, is greatest. The eccentric bore 24 for receiving the eccentric collar 22 has a maximum radius (measured from the connector axis) 180° from the opening 32. Accordingly, the collar 22 and the sleeve 13 are rotated 180° from the position in which the collar 22 is inserted in the eccentric bore in order to reach the locking position in which the spring nose 28 drops into the notch 26. In order to accomplish the locking with a fractional rotation of the sleeve 13, I provide a collar with a plurality of lobes instead of a single lobe as in Figs. 1 and 2. For example, as illustrated in Figs. 3 and 4, a double-lobe collar may be provided so that the locking is accomplished by a 90° rotation of the sleeve.

Figure 3:
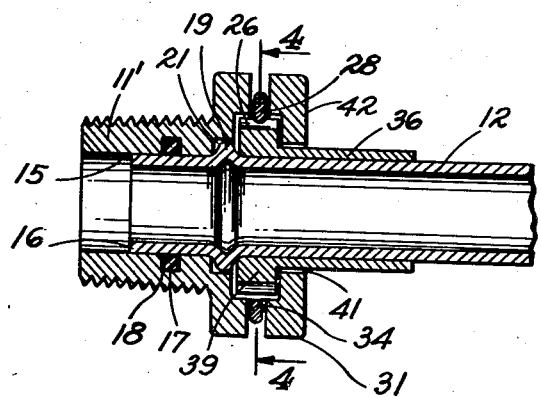
Fig. 3 is a longitudinal, medial, sectional view of a tube coupling in which the tubing may be locked by a fractional turn of the locking sleeve.
Figure 4:
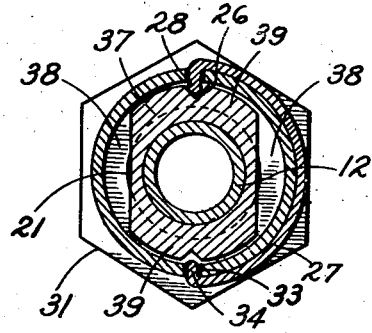
Fig. 4 is a view of a cross section of the coupling shown in Fig. 3, represented as cut by a plane 4—4 with the sleeve in the locking position.

In the arrangement of Fig. 3, as in the arrangement of Figs. 1 and 2, there is a connector 11' having a tube-receiving bore 15 and a counter-bore 21 for the tube bead 19. Likewise, the connector 11' has a circular concentric counter-bore 26 of a greater diameter than the counter-bore 21. There is a sleeve 36 with a double-lobe collar 37, which may, for example, have a concentric circular outline with segments 38 cut away so as to leave two symmetrical lobes 39 fitting within the circular undercut counter-bore 35. An opening 41, corresponding in shape to the outline of the collar 37, and having the shape of a circle with flattened sides, is provided in the face 42 of the connector 11'. A locking wire 27 is provided, as in the arrangement of Figs. 1 and 2, and one or both of the lobes 39 of the collar 37 is provided with a spring nose receiving-notch 26, as in the arrangement of Figs. 1 and 2.

Figure 5:
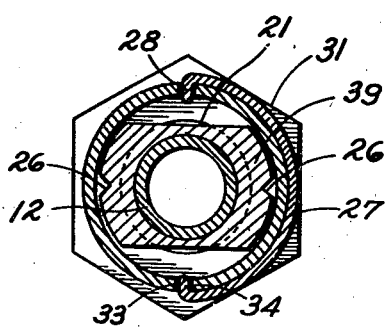
Fig. 5 is a cross-sectional view corresponding to Fig. 4, but with the sleeve in the tube-detaching position.

In order to insert the sleeve 36, it is turned to the position illustrated in Fig. 5 to enable the collar 37 to be inserted in the opening 41 in the connector 11'. After the tube 12 has been pushed into the bore 15 so as to engage the O-ring seal and bring the bead 19 into the smaller counter-bore 21, the sleeve 36 is rotated 90° to the position illustrated in Fig. 4, in which the spring nose 28 drops into the notch 26 and yieldably locks the parts in position. The sleeve may be disconnected quickly, and the tubing may be detached quickly and easily by simply rotating the collar 37 90° in either direction, exerting sufficient rotary force to cause the spring nose 28 to rise up on the sloping sides of the notch 26.

I have herein shown and particularly described certain embodiments of my invention and certain methods of operation embraced therein for the purpose of explaining its principle of operation and showing its application, but it will be obvious to those skilled in the art that many modifications and variations are possible and I aim, therefore, to cover all such modifications and variations as fall within the scope of my invention which is defined in the appended claims.

What I claim is:

1. A tube coupling comprising in combination a tube having a flare spaced from the end thereof, a connector having a bore adapted to receive the tube, a sleeve surrounding said tube on the side of said flare away from the end of the tube, and a lock wire, the connector bore having an annular groove therein containing an O-ring for sealing the tube in said bore against fluid leakage, said connector having a first counter-bore receiving the tube flare, having an eccentric bore beyond said counter-bore, and having a concentric second counter-bore of greater diameter than the first between the said first counter-bore and the eccentric bore, said sleeve having an eccentric collar adapted to fit loosely in said eccentric bore and fitting within said second counter-bore, whereby the sleeve collar may be inserted in said eccentric bore for assembly of the coupling and may be turned within the second counter-bore to a locking position for securing the tubing in said connector, said connector having a radial opening intersecting said second counter-bore, said lock wire being mounted on said connector with a prong pressed resiliently inward through the opening in said connector, and said collar having a notch adapted to engage said wire with the collar turned to the locking position thereof.

2. A tube coupling comprising in combination a tube having a flare spaced from the end thereof, a connector having a bore adapted to receive the tube, and a sleeve surrounding said tube on the side of said flare away from the end of the tube, the connector having a first counter-bore receiving the tube flare, having an eccentric bore beyond said counter-bore, and having a concentric second counter-bore of greater diameter than the first between the said first counter-bore and the eccentric bore, said sleeve having an eccentric collar adapted to fit loosely in said eccentric bore and fitting within said second counter-bore, whereby the sleeve collar may be inserted in said eccentric bore for assembly of the coupling and may be turned within the second counter-bore for securing the tubing in said connector.

3. A coupling for a tube having a flare near the end thereof, said coupling comprising a connector and a sleeve adapted to surround the tube, the connector having a main bore providing a continuation of the passageway through a tube, having an eccentric bore at the face of the connector, and having an undercut bore, said sleeve having an eccentric collar adapted to fit loosely in said eccentric bore and fitting within said undercut bore, whereby the sleeve collar may be inserted in said eccentric bore for assembly of the coupling and may be turned within the undercut bore for securing the tube in said connector.

4. A coupling for a tube having a protuberance near the end thereof, said coupling comprising a connector and a sleeve adapted to surround the tube, the connector having a main bore providing a continuation of the passageway through a tube, having an opening in the connector face in the form of a circle with flattened sides, and having an undercut circular bore concentric with the main bore between the face opening and the main bore, said sleeve having a collar conforming substantially in shape to the face opening and adapted to fit therein, and fitting within the undercut bore, whereby the sleeve collar may be inserted in said face opening for assembly of the coupling and may be turned within the undercut bore for securing the tube in said connector.

5. A coupling as described in claim 4, having resilient means for yieldably retaining the sleeve in an angular position away from that registering with the face opening, whereby the sleeve is secured in said connector.

6. A tube coupling comprising in combination a connector and a tubular member carrying a collar, the connector having a bore serving as a continuation passageway for the tubular member, having an eccentric bore at the face thereof and having a concentric counterbore of greater diameter than either of said bores between the eccentric bore and the remainder of the coupling, said tubular member having an eccentric collar adapted to fit loosely in said eccentric bore and fitting within said concentric counterbore, whereby the tubular member may be inserted in said eccentric bore for assembly of the coupling and may be turned within the counterbore to a locking position for securement in said connector.

ROBERT E. HEROLD.

REFERENCES CITED

The following references are of record in the file of this patent:

UNITED STATES PATENTS

| Number | Name | Date |
|---|---|---|
| 136,328 | Lewis | Feb. 25, 1873 |